United States Patent [19]

Claussen et al.

[11] Patent Number: 5,122,557
[45] Date of Patent: Jun. 16, 1992

[54] LIGHT POLARIZING FILMS OR FOILS AND DYES FOR THEIR PRODUCTION

[75] Inventors: Uwe Claussen, Leverkusen; Friedrich W. Kröck, Odenthal-Gloebusch, both of Fed. Rep. of Germany

[73] Assignee: Bayer Aktiengesellschaft, Leverkusen, Fed. Rep. of Germany

[21] Appl. No.: 709,330

[22] Filed: Jun. 3, 1991

[30] Foreign Application Priority Data

Jun. 16, 1990 [DE] Fed. Rep. of Germany ....... 4019309

[51] Int. Cl.$^5$ ............................ C08J 5/18; F21V 9/14
[52] U.S. Cl. ...................................... 524/162; 524/41; 524/158; 524/503; 524/514; 524/524; 252/585
[58] Field of Search .................. 524/158, 162, 503

[56] References Cited

U.S. PATENT DOCUMENTS 4,224,205 9/1980 Nakagawa et al. ................ 524/162
5,007,942 4/1991 Claussen et al. ......................... 428/1

FOREIGN PATENT DOCUMENTS 1583595 2/1969 France .

*Primary Examiner*—Paul R. Michl
*Assistant Examiner*—Tae H. Yoon
*Attorney, Agent, or Firm*—Connolly and Hutz

[57] ABSTRACT

The present invention relates to light polarizing films containing water-soluble, transparent organic polymers and dichroic dyes capable of fluorescence and to new dichroic dyes.

8 Claims, No Drawings

LIGHT POLARIZING FILMS OR FOILS AND DYES FOR THEIR PRODUCTION

The present invention relates to light polarizing films containing water-soluble, transparent organic polymers and dichroic dyes capable of fluorescence containing water-solubilizing functional groups and to new dichroic dyes.

Films based on polyvinyl alcohol (PVAL) and containing iodine or dichroic dyes as polarizing agents are known.

The only polarizers which have hitherto been used technically are those containing iodine. These are used, for example, in passive liquid crystal displays for rendering the information visible. In the absence of moisture, these films have excellent light-fastness and outstanding dichroic properties in the longwave region of the visible spectrum. The active agent of these films is the iodine-PVAL complex (M.M.Zwick, J. Appl. Polym. Sci.; 9 2393-2424 (1965)) which absorbs daylight over a wide band but not completely. In the shortwave (orange-yellow) range of the spectrum, there lies a region of diminished extinction, which causes the foils to have a blue colour of their own.

This has adverse consequences if white light is required to be obtained after the passage through the foil. The unpolarized light which has been transmitted reduces the dichroism and hence the polarizing power in this region. For increasing the dichroism, it is necessary to increase the concentration of the iodine complex. This correction in the shortwave region, however, entails excessive extinction in the longwave region. This in turn results in a marked weakening of the transmitted light at the point of transmission. An optical indicator fitted with this foil is reduced in brightness. Compromise is necessary if acceptable degrees of brightness are to be obtained.

One important critical measuring magnitude of a universally usable optical indicator is the legibility at different illumination ratios. This is normally expressed as the "Perceived contrast ratio" (PCR = transmission in the pass-through position (TII): transmission in the blocking position (T⊥)). It follows from this that the transmission should on the one hand be made as small as possible in the blocking position (T⊥) (legibility in the dark) and on the other hand as great as possible in the pass-through position (TII) (legibility in bright light). This requires a completely uniform and very high polarization power of the filter over the whole range of the visible spectrum, which is basically impossible to achieve with the iodine foil.

The multiplicity of substances and properties and their high technical level have hitherto prevented the possibility of producing a polarization foil in which the chromophore is not iodine nor an iodine complex although these would have marked advantages in the resistance to moisture and heat. Experiments carried out to produce a polarization foil on the basis of the dyes require a whole range of well adjusted dyes.

The mode of action of a polarization foil and the underlying physical principles as well as the structural preconditions therefor in the matrix have been disclosed, e.g. in U.S. Pat. No. 4 440 451.

Dyes may emit the absorbed light as radiation energy. The light which they have absorbed is given off by them in the form of a radiation known as fluorescence. If the light-absorption of a dye is dichroic, the emission should also be dichroic. It is known, however, that it has not been possible to prove the existence of a polarized fluorescence (N.V. Platonova, K.R.Popov, CA 90(26):205753c) although it was shown at a later date that the dyes used could very well be orientated under the conditions employed (Y.Matsuoka, K.Yamaoka, Bull.Chem.Soc. (Japan), 52(11), 3163(1979)). The presence of an order whose existence has been proved by absorption therefore does not at the same time denote the occurrence of a polarized fluorescence.

We have now surprisingly found that certain dyes capable of fluorescence have excellent dichroic properties both in absorption and in emission and are very well suited for the production of light polarizing films or foils.

This invention therefore relates to light polarizing films or foils containing organic, water-soluble polymers and one or more dyes which in the form of their free acid correspond to the general formula (I)

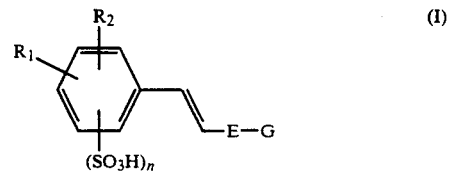

in which
G denotes hydrogen or the group Y

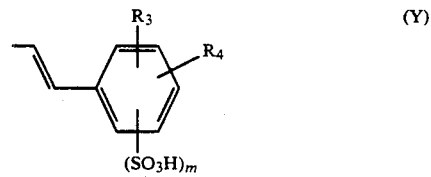

and in which, when G stands for hydrogen, E stands for an optionally substituted aromatic group, and when G has the meaning of the group Y, E stands for a group of the formula $(C_6H_4)_p$, where p stands for the numbers 1, 2 or 3, preferably 2, or it stands for the group

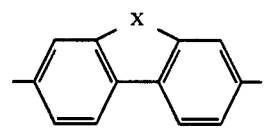

in which
X stands for two H atoms or for a bridging residue —$CH_2$—, —$CH_2$—$CH_2$— or —O—,
and is optionally substituted by at least one sulphonic acid group, the groups $R_1$ to $R_4$ may be identical or different and denote, independently of one another, hydrogen, alkyl, trifluoromethyl, alkoxy, aralkoxy, alkyleneoxy, the group NRR' wherein R=R' or hydrogen and R'=a lower alkyl, an acyl or sulphonyl or a heterocyclic 5- or 6- membered ring attached via N or C, or it denotes halogen or a carboxyl, cyano, alkylsulphone, arylsulphone, carbonamide, sulphonamide or carboxylic acid ester group, or $R_1$ and $R_2$ together or $R_3$ and $R_4$ together stand for a condensed benzene ring, m and n denote, independently of one another, the numbers 0, 1 or 2, under the condition that when m and n both stand for 0, the group E contains at least one sulphonic acid group, which group E may be further substituted.

The following are examples of substituents for the group E: $C_1$-$C_5$-alkyl groups which may in turn be substituted by hydroxy, cyano, halogen or phenyl or interrupted by O, e.g. methyl, ethyl, cyanoethyl, tert.-butyl, benzyl, halogen atoms such as chlorine, bromine or fluorine, preferably chlorine, $C_1$-$C_5$-alkanesulphonyl groups such as methanesulphonyl, ethanesulphonyl, n-butanesulphonyl, $\beta$-hydroxy-ethanesulphonyl, an $\omega$-toluenesulphonyl group, a benzenesulphonyl group, a carbonamide or sulphonyl group optionally mono- or di-substituted by $C_1$-$C_4$-alkyl groups, and carboxylic acid $C_1$-$C_4$-alkyl ester groups.

A suitable alkyl group denoted by $R_1$-$R_4$ is in particular $C_1$-$C_2$-alkyl; a suitable alkoxy group denoted by $R_1$-$R_4$ is in particular $C_1$-$C_2$-alkoxy; a suitable aralkoxy group denoted by $R_1$-$R_4$ is in particular benzyloxy and a suitable alkenyloxy group denoted by $R_1$-$R_4$ is in particular $C_2$-$C_4$-alkyleneoxy. An alkylsulphonyl group denoted by $R_1$-$R_4$ is preferably $C_1$-$C_4$-alkylsulphonyl; an arylsulphonyl group denoted by $R_1$-$R_4$ is preferably phenylsulphonyl. The carbonamide and sulphonamide groups $R_1$-$R_4$ may be mono- or disubstituted by $C_1$-$C_4$alkyl groups. Carboxylic acid ester groups denoted by $R_1$-$R_4$ are preferably $C_1$-$C_4$-alkyl ester groups.

Dyes corresponding to formula (II) are preferred

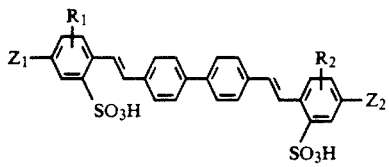

(II)

in which $Z_1$ and $Z_2$ denote, independently of one another, a hydrogen atom, Cl, N-acyl, N-alkyl, a group attached via N or the group $C_6H_4SO_3H$. The heterocyclic group is preferably the triazolyl group.

Dyes having this constitution are in part already known, for example from Swiss Patent Specifications 554 821 and 505 036 and German Offenlegungsschriften 22 09 221, 22 62 531, 22 01 857, 23 25 302, 23 32 089, 23 37 845 and 27 00 292.

The dichroism of these dyes has not hitherto been known. It is surprisingly very high.

The dyes in which $Z_1$, $Z_2$ N-acyl, N-alkyl or triazolyl are new. The present invention thus further relates to dyes corresponding to formula (I) in which $R_1$, $R_2$, $R_3$ and $R_4$ denote, independently of one another, the group NRR' or hydrogen but at least two of the groups denoted by $R_1$, $R_2$, $R_3$ and $R_4$ are NRR' groups wherein R=R' or H and R' denotes an acyl or alkyl group or together with R denotes a triazole group, and in which, further, G stands for a group of the formula Y

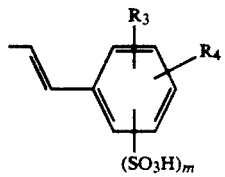

(Y)

and m, n and E have the meanings indicated above for formula (I).

The dyes are prepared by known methods from the corresponding amines or diamines which in turn are obtainable, for example, by the condensation of 4-nitrobenzaldehyde-2-sulphonic acid, which is known from the literature, with a phosphonate, followed by reduction of the nitro group.

The organic polymer is preferably an orientated polymer which forms transparent films and is compatible with dyes containing acid groups. The following are examples of such polymers: Polyamides, cellulose(acetate), vinyl alcohol homo- and copolymers and vinyl acetate homo- and copolymers in which, for example, ethylene, propylene, crotonic acid, (meth)acrylic acid or maleic acid may be present as comonomers. It is preferred to use polyvinyl alcohols which have been prepared by complete or partial saponification of polyvinyl cetate, in particular types which, when present as a 4% aqueous solution, have a viscosity >4 mPa.s, preferably from 35 to 70 mPa.s at 20° C. and a degree of saponification above 80 mol-%, preferably from 85 to 100 mol-%.

The films preferably contain from 0.005 to 5% by weight, most preferably from 0.05 to 3% by weight, of dyes, based on 100% by weight of the film.

Colouring of the films is carried out in known manner, for example by colouring the polymers dissolved in water. The film is prepared in known manner from the solution by preparing a raw film from 5 to 150 μm, preferably from 20 to 50 μm in thickness and stretching this film by 300 to 1000% at a temperature from 60° to 180° C., preferably from 100° to 150° C.

It is advisable to free the dyes or dye salts from foreign salts before use, e.g. by recrystallisation, extraction and/or dialysis.

If desired, the films containing dyes may be subjected to an after-treatment,[e g. with aqueous boric acid solution, for the purpose of improving the resistance to moisture or the transparency to light. The conditions under which such after-treatment is carried out may vary independently of the material of the film and the dye. It is preferable to employ a 1 to 15% by weight boric acid solution, most preferably a 5 to 10% by weight boric acid solution, at 30° to 80° C., most preferably at 50° to 80° C. Tensides and optionally inorganic salts are preferably added to the boric acid solution. The tensides may be non-ionic, cationic or anionic and are preferably non-ionic.

Products of addition of ethylene oxide to higher alcohols or phenols, for example nonyl phenol, are examples of non-ionic tensides. The amount of tenside used is preferably from 0.005 to 0.5% by weight, most preferably from 0.02 to 0.2% by weight, based on the quantity of water. The inorganic salts used are preferably sodium sulphate or potassium sulphate, sodium chloride, KCl or sodium nitrate. The quantity of inorganic salts used is preferably from 0.1 to 5% by weight, most preferably from 0.3 to 3% by weight, based on the quantity of water. If desired, the product may be fixed with an aqueous solution of a high molecular weight, cationic compound.

The dichroism of the system may be considerably reinforced by adding to the casting solution lower monohydric or polyhydric alcohols such as methanol, ethanol or glycol, glycerol, trimethylolethane, trimethylolpropane, pentaerythritol or sorbitol or ethers thereof such as glycol monomethylether, glycol monoethylether or glycol dimethylether, lower hydroxylamines such as propanolamine or amides such as DMF, N-methylpyrrolidone, pyrrolidone or ε-caprolactam. The additives may be used singly or, preferably, as mixtures which may also contain low monohydric alcohols such as methanol, ethanol or i-propanol.

The additives are preferably added to the casting solution in quantities amounting to 5 to 50% by weight, based on 100% by weight of the casting solution.

Surface-active compounds may be used in addition to control the surface tension. Examples of suitable surface-active compounds include sulphonic acids such as alkane-sulphonic acids, in particular sulphosuccinic acid octyl ester, perfluoroalkane sulphonic acids, in particular perfluorooctane sulphonic acid and tetralkylammonium salts thereof, for example the tetraethylammonium salt, sulphates, in particular sulphated alkylphenol polyglycol ethers or alkylsulphonates, amphoteric tensides, in particular alkaneamido propyl betaines, for example lauramide propyl betaine, and the compounds with the following REG numbers mentioned in CA: 73772-45-9, 96565-37-6, 4292-10-8, 59272-84-3, 25729-05-9, 6179-44-8, 21244-99-5, 58793-79-6, 32954-43-1 and 92836-76-5, as well as nonionic tensides such as 4-octylphenol polyglycolether.

The light polarizing films or foils may be compounded or laminated in known manner with other materials which are free from double refraction. Suitable for use as protective coverings are, for example, foils of a tetrafluoroethylene-hexafluoroethylene copolymer or of some other fluorohydrocarbon resin, a polyester, polyolefin or polyamide resin, a polycarbonate or a cellulose ester, preferably cellulose(tri)acetate, propionate or butyrate.

The films or foils according to the invention may be used as polarization filters, for the production of linear-polarized light, for rendering ordered structures visible for the analysis of polymers, and in biological material.

EXAMPLES

Example 1

0.03 g of the dye of the following formula free from salts and suspension agents:

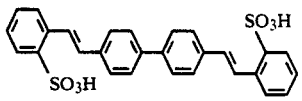

are dissolved in 190 g of demineralized water at 80° C. with stirring. 9.97 g of Mowiol 28-99 (saponified polyvinyl acetate; degree of saponification 99.4±0.4 mol-%; viscosity of the 4% solution at 20° C. (DIN 35 015)=28 ±2mPas; Manufacturers Hoechst AG) are dissolved in the solution and 2.5 g of glycerol and 5 g of methanol are then added to 92.5 g of the resulting solution.

The casting solution obtained is applied with a doctor knife to a glass plate to form a layer 500 μm in thickness. After drying at room temperature, the foil thus obtained is detached from its support and then tempered at 30° C. for 15 minutes and stretched monoaxially at this temperature to about 700% of its original length at a rate of 10 cm/min. The foil shows a maximum contrast ratio of 16.5 with polarized light in the extinction maximum at 371 nm.

Example 2

0.06 g of the dye of Example 1 free from salts and suspension agents are dissolved hot in 100 g of water. 10 g of glycerol are added and 19.9 g of Mowiol 28-99 are introduced with stirring when the solution is cold. After one hour's stirring at room temperature, the solution is heated to 90° C. and stirred at this temperature until, after about 3 hours, a homogeneous solution is obtained. 5 g of methanol are then stirred in at 50° C. The warm solution is filtered through a filter press under air pressure and then degasified in an ultra-sound bath. To produce a foil, the casting solution is continuously applied with a 250 μm doctor knife to a casting drum (diameter of drum 25 cm, speed of rotation about 7.5 revs/min) which has been preheated to about 50° C. Heated air is passed over the layer for drying and the solidified foil is continuously stripped from the drum and after-dried. The resulting foil is 40 m in thickness. It is stretched as described above and similar dichroic results are obtained.

Examples 3 to 7

The procedure is the same as described in Example 1 but the substances shown in the Table are used, and the extinction ratios shown in the column marked CR are obtained.

| Examples | Groups: $R_1 = R_3$ | Group: E | Dichroic ratio CR |
|---|---|---|---|
| 3 | 4-Cl | 4,4'-biphenyl | 10.7 |
| 4 | H | 2,5-dichlorophenyl | 11.8 |
| 5 | H | 4,4'-biphenyl-3, 3'-disulphonic acid | 14.7 |
| 6 | 3-CH$_3$ For G = H, $R_2$ = H | 4,4'-biphenyl | 13.5 |
| 7 | 4-CN | 4-biphenyl-4'-sulphonic acid | 14.7 |

We claim:

1. Light polarizing films or foils containing organic, water-soluble polymers and one or more dyes which correspond, in the form of the free acid, to the general formula (I)

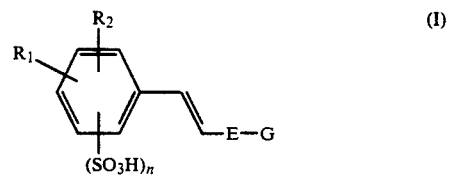

in which
G stands for hydrogen or the group Y

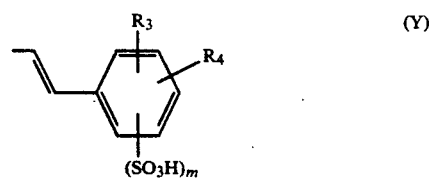

and in which,
when G stands for hydrogen, E stands for an optionally substituted aromatic group,
when G stands for the group Y, E stands for a group of the formula $(C_6H_4)_p$ wherein p denotes the number 1, 2 or 3,
or it stands for the group

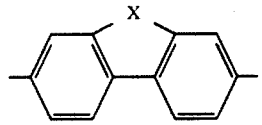

in which

X denotes two H atoms or a bridging residue —CH$_2$—, —CH$_2$—CH$_2$— or —O—, and is optionally substituted by at least one sulphonic acid group, the groups R$_1$ to R$_4$ may be identical or different and denote, independently of one another, hydrogen, alkyl, trifluoromethyl, alkoxy, aralkoxy, alkyleneoxy, the group NRR' in which R=R' or hydrogen and R'=lower alkyl, acyl, sulphonyl or a heterocyclic 5- or 6-membered ring attached by a N or C, or they denote halogen or a carboxy, cyano, alkylsulphone, arylsulphone, carbonamide, sulphonamide or carboxylic acid ester group or R$_1$ and R$_2$ together or R$_3$ and R$_4$ together may stand for a condensed benzene ring, and m and n denote, independently of one another, the numbers 0, 1 or 2, under the condition that when m and n stand for 0, the group E contains at least one sulphonic acid group, and the group E may be further substituted.

2. Films or foils according to claim 1, containing, as organic polymer, polyamides, cellulose acetate, vinyl alcohol homo- and -copolymers or vinyl acetate homo- and -copolymers.

3. Films or foils according to claim 1, containing, as organic polymer, polyvinyl alcohols which have been prepared by complete or partial saponification of polyvinyl acetate.

4. Films or foils according to claim 3, containing polyvinyl alcohols which have a degree of saponification >80 mol-% and a viscosity above 4 mPa.s at 20° C.

5. Films or foils according to claim 1 containing, as dyes, compounds corresponding to formula (II)

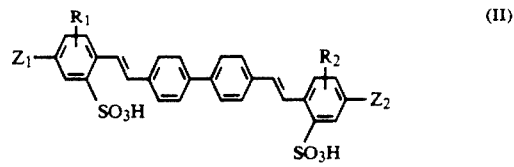

wherein

Z$_1$ and Z$_2$ denote, independently of one another, a hydrogen atom, Cl, N-acyl, N-alkyl, a group attached through N or the group C$_6$H$_4$SO$_3$H and in which R$_1$ and R$_2$, which may be identical or different, denote, independently of one another, hydrogen, alkyl, trifluoromethyl, alkoxy, aralkoxy, alkenoxy, the group NR'R wherein R stands for the group R' or hydrogen and R', optionally together with R, stands for a heterocyclic 5- or 6-membered ring, or they denote halogen or a carboxy, cyano, alkylsulphone, arylsulphone, carbonamide, sulphonamide or carboxylic acid ester group.

6. Films or foils according to claim 1 containing, based on 100% by weight of the film, from 0.005 to 5% by weight of the dyes mentioned in claim 1.

7. Films or foils according to claim 1 which are stretched by 300 to 1000% at a temperature from 60 to 180° C.

8. A filter device for polarizing light which comprises a film or foil claimed in claim 1.

* * * * *